United States Patent [19]

Koenig

[11] Patent Number: 4,664,346
[45] Date of Patent: May 12, 1987

[54] METHOD AND APPARATUS FOR STABILIZING THE STEERING FORCE IN AN AIRCRAFT, ESPECIALLY A HELICOPTER

[75] Inventor: Herbert Koenig, Munich, Fed. Rep. of Germany

[73] Assignee: Messerschmitt-Boelkow-Blohm GmbH, Munich, Fed. Rep. of Germany

[21] Appl. No.: 730,546

[22] Filed: May 6, 1985

[30] Foreign Application Priority Data

May 8, 1984 [DE] Fed. Rep. of Germany ....... 3416969

[51] Int. Cl.$^4$ ............................................. B64C 13/46
[52] U.S. Cl. ................................. 244/223; 244/17.13; 244/178; 318/628
[58] Field of Search .................... 244/223, 17.13, 178, 244/221; 318/628

[56] References Cited

U.S. PATENT DOCUMENTS

| | | | |
|---|---|---|---|
| 2,801,060 | 7/1957 | Bonsteel et al. | 244/223 |
| 3,021,097 | 2/1962 | Hecht | 244/178 |
| 3,733,039 | 5/1973 | O'Connor et al. | 244/17.13 |
| 3,960,348 | 6/1976 | Fowler et al. | 244/223 |
| 4,168,045 | 9/1979 | Wright et al. | 244/221 |
| 4,236,685 | 12/1980 | Kissel | 244/223 |
| 4,330,829 | 5/1982 | Fischer et al. | 244/17.13 |

FOREIGN PATENT DOCUMENTS 0003947 2/1983 European Pat. Off.

Primary Examiner—Joseph F. Peters, Jr.
Assistant Examiner—Lynn M. Fiorito
Attorney, Agent, or Firm—W. G. Fasse; D. H. Kane, Jr.

[57] ABSTRACT

The steering or control force for operating a steering column in an aircraft, especially in a rotary wing aircraft, is stabilized. The steering column influences through an articulated steering or control linkage the elevator assembly or the rotor blade adjustment, whereby a signal is employed which is dependent on the measured flight speed. It is necessary to signal to the pilot at all times how the steering column must be moved. Such signalling must be definite and free of any disturbing influences and the pilot must receive such signalling through the steering column manual force which is a force reacting to the operation of the steering column. For this purpose a speed dependent signal is supplied to a servomotor. This signal rises with the flight speed at least above a preselectable threshold value. The servomotor in turn controls the tensioning state of a spring which is pivoted at one end to the steering column and at the other end to the displacement member of the servomotor. Preferably, the point of articulation between the spring and the steering column is located approximately opposite the point of articulation between the steering column and the steering or control linkage. Additionally, a feedback signal derived from sensing the displacement caused by the servomotor is added to the speed dependent signal. The feedback signal varies in the same sense as the displacement caused by the servomotor and serves to achieve proportionality between the signal S and said displacement.

13 Claims, 3 Drawing Figures

FIG. 1
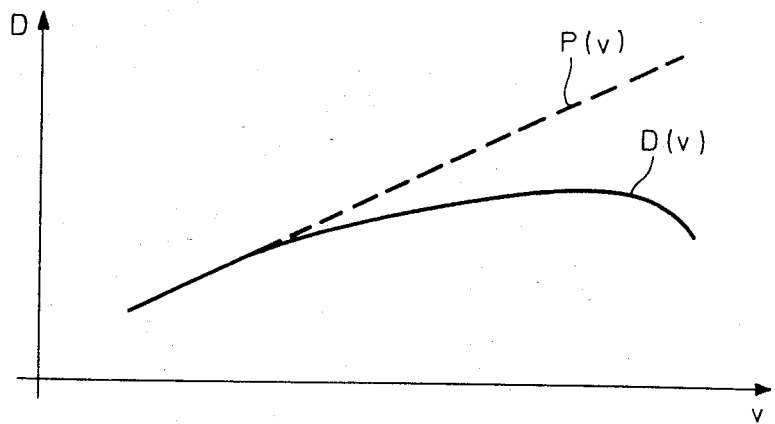
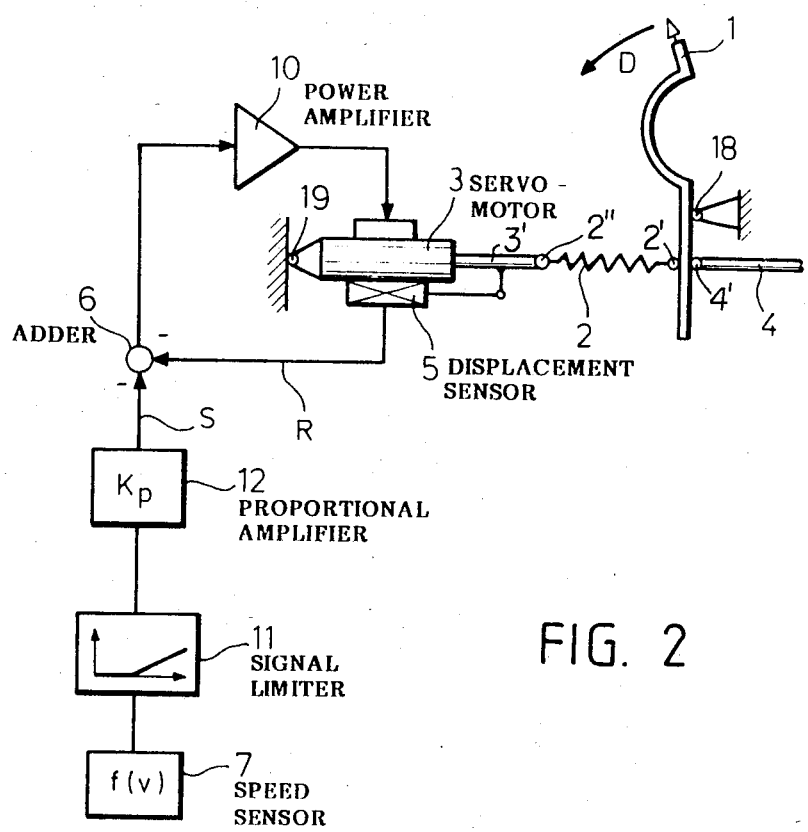
FIG. 2

METHOD AND APPARATUS FOR STABILIZING THE STEERING FORCE IN AN AIRCRAFT, ESPECIALLY A HELICOPTER

FIELD OF THE INVENTION

The invention relates to a method and apparatus for stabilizing the steering force of an aircraft, especially a rotary wing aircraft, in which the position of the elevator assembly or of the rotor blades is influenced or controlled by the pilot through the control stick or column and through a control linkage which is pivoted to the control stick or column. Such control takes place in response to a signal which depends on the flight speed of the craft. The terms steering and control are used interchangeably.

DESCRIPTION OF THE PRIOR ART

In order to vary the horizontal flight speed of a rotary wing aircraft or helicopter, the pilot will first operate the power lever which influences the collective rotor blade adjustment. The operation of the power lever must not change a horizontal flight into a climbing or descending flight. Therefore, it is necessary to simultaneously correct the pitching attitude of the helicopter correspondingly with the aid of the control stick or column which influences the cyclical rotor blade adjustment. For relatively low flight speeds there is a definite relationship between the pitching attitude of the craft and the position of the steering column to the effect that the steering column must be tilted more and more into the forward direction with an increasing flight speed, whereby simultaneously the helicopter nose is tilted downwardly. Additionally, the pilot senses an increasing resistance when he tilts the steering column in the forward direction.

Such increasing resistance signals directly to the pilot through the respectively larger control or manual force an increased flight speed. However, in connection with several modern helicopters capable of flying at speeds in excess of 100 knots, problems have been encountered in the upper speed range. These problems are due to the fact that the definite relationship between the control or manual force corresponding to the tilting of the control column and the flight speed at lower flight speeds, is reversed at higher flight speeds. Reference is made in this connection to the full line curve in FIG. 1, which changes from a range of positive slope into a range of negative slope at higher flight speeds.

FIG. 1 illustrates the longitudinal displacement D of the steering column as a function of the flying speed v, measured in knots. As shown by the full line curve D (v) the longitudinal displacement first increases with the flying speed until it reaches a maximum, whereupon it decreases again with further increasing flying speeds. As a result, the control or manual force is correspondingly decreased once the maximum value has been passed. Thus, the normally present proportionality between the steering column longitudinal displacement and the speed is lost. Thus, in order to increase the flying speed, the pilot would have to pull back the steering column after operating the power lever. Such operation, however, is not permitted under the technical regulations applicable to helicopters. Rather, according to these regulations it is required that the pilot must always sense in each speed range a backwardly directed resistance of the steering column when the pilot displaces the steering column in the direction of a flight speed increase. These regulations also require that this resistance must increase with each correction movement aiming at increasing the flight speed. Such a response characteristic of the steering column however, is not provided as may be seen from the full line curve in FIG. 1. Therefore, respective corrective steps must be taken for stabilizing the control or steering force.

The just outlined problems become even more difficult due to the fact that the full line curve in FIG. 1 depends in its position on different parameters, for example, on the load of the helicopter and on the distribution of the load within the helicopter. Even the air temperature has an influence on the position of the full line curve in FIG. 1. As a result, it is difficult for the pilot to determine right away in which range of the curve he is presently operating.

European Patent EP-PS No. 0,003,947 corresponding to U.S. Pat. No. 4,168,045 (Wright et al), describes a control device for the adjustment or displacement of the blade angle for a helicopter in which the above described problems have been taken into account. In this European Patent No. 0,003,947 efforts are being made to convert the negative slope of the full line curve in FIG. 1 at high speeds into a positive slope. For this purpose the control linkage articulated to the steering column has been modified in order to influence the cyclical rotor blade adjustment. More specifically, at least one longitudinally effective member is inserted into the control linkage and such member is variable in its length. For example, a servomotor drive is employed by means of which the controlled lengthening of the control linkage applies an adjustment instruction to the rotor without any need for the pilot changing the position of the steering column.

In said European Patent No. 0,003,947 a signal is supplied to the servo-drive motor for controlling the servo-drive motor and such signal includes a speed representing component as well as a component derived from the position of the power lever. The path for forming this signal comprises several electronic components such as amplifiers, summing members, reference voltage sources, differentiating members and limiting circuits. The adjustment displacement caused by the servo-drive motor in response to the arrival of a signal is measured by means of a displacement pick-up or sensor and fed back to the input of the amplifier operatively connected to the input of the servo-drive motor. This circuit arrangement is capable to modify the full line curve of FIG. 1 in such a way that the range of negative slope occurring at higher flight speeds is changed into a range with a positive slope. However, this prior art structure also has its disadvantages. The main disadvantage is seen in that disturbances in the signal path leading to the servo-drive motor arranged in the control linkage, are effective instantly and directly in an undesirable manner. Under these conditions the pilot has an opportunity to make corrections only after the undesirable movement of the helicopter begins following the occurrence of the disturbance causing the undesirable movement, whereby a respective reaction time elapses first. Such a situation caused by an unexpected disturbance can result in a nosedive which in turn may end in a catastrophe. In order to avoid this, it would be necessary to provide all components required in the signal path leading to the servo-drive motor in a redundant manner. Such redundancy, however, calls for a high expenditure for structural components which, possibly is not justified.

Additionally, it is not clear from the disclosure of European Pat. No. 0,003,947 how in this prior art control mechanism the control or manual force can be influenced in accordance with the above mentioned requirements in such a manner that the control force which the pilot feels when operating the steering column, provides a "feel" to the pilot which tells him with what kind of steering column movement he must react in any given situation.

OBJECTS OF THE INVENTION

In view of the above it is the aim of the invention to achieve the following objects singly or in combination:

to provide a method and apparatus which will supply the pilot with a signal how to move the steering column in any given situation in response to the reaction force which the pilot feels or senses when he holds the steering column, whereby this signalling to the pilot must be provided at all times in a definite manner free of any disturbances;

to construct the apparatus for the just stated purpose in as simple a manner as possible, whereby the need for a redundant implementation of the apparatus components is avoided;

to avoid directly influencing the control linkage as is the case in the prior art; and to enable the pilot to always react properly to the force imparted to the pilot's hand by the steering column.

SUMMARY OF THE INVENTION

The foregoing objects have been achieved according to the invention by supplying a speed dependent signal, which increases in response to a rising flight speed at least above a predeterminable threshold speed value, to a servomotor, which influences the tensioning state of a spring connected to the steering column and to the servomotor. A feedback signal dependent on the motor output position is added to the speed dependent signal. The feedback signal is produced by measuring or sensing the control or regulating distance or displacement caused by the servomotor so that the feedback signal varies in the same sense as the control displacement or distance. Preferably, the spring is connected to the steering column at a point approximately opposite to a point connected to the steering linkage leading to the blade adjustment means of the helicopter rotor.

The apparatus of the invention for performing the present method incorporates the steering column and the steering linkage articulated to the steering column for influencing the rotor blade adjustment, and a flight speed sensor. Additionally, the present apparatus comprises a servomotor, a spring connected between the steering column and the servomotor, a displacement sensor or pick-up which measures the displacement caused by the servomotor, and a signal adding circuit connected with its inputs to the flight speed sensor and to the displacement pick-up and with its output to said servomotor for tensioning the spring in such a way that the resistance feel imparted to the pilot operating the steering column increases with an increasing flight speed. A reduced reaction force at higher speeds is avoided.

Accordingly, contrary to the above described control mechanism, the invention does not interfere with the steering linkage articulated to the steering column for the rotor blade adjustment in any direct sense. Rather, according to the invention an additional servomotor connected to a spring is provided, whereby the spring is pivoted preferably to a point approximately opposite the point at which the steering linkage is articulated to the steering column. For controlling the servomotor the invention requires merely a signal derived from the flight speed. This feature is also advantageous in comparison to the prior art because it is a simplification. The displacement caused by the servomotor in response to the control signal is measured according to the invention and used as a feedback signal to the input of the servomotor for causing the desired "feel" for the pilot operating the steering column.

BRIEF DESCRIPTION OF THE DRAWINGS

Details of the invention will be described by way of example with reference to the accompanying drawings, wherein:

FIG. 1 shows the longitudinal displacement D of the steering column as a function of the flight speed v in knots;

FIG. 2 is a block circuit diagram of a first simple embodiment of an apparatus according to the invention.

Figure 3:
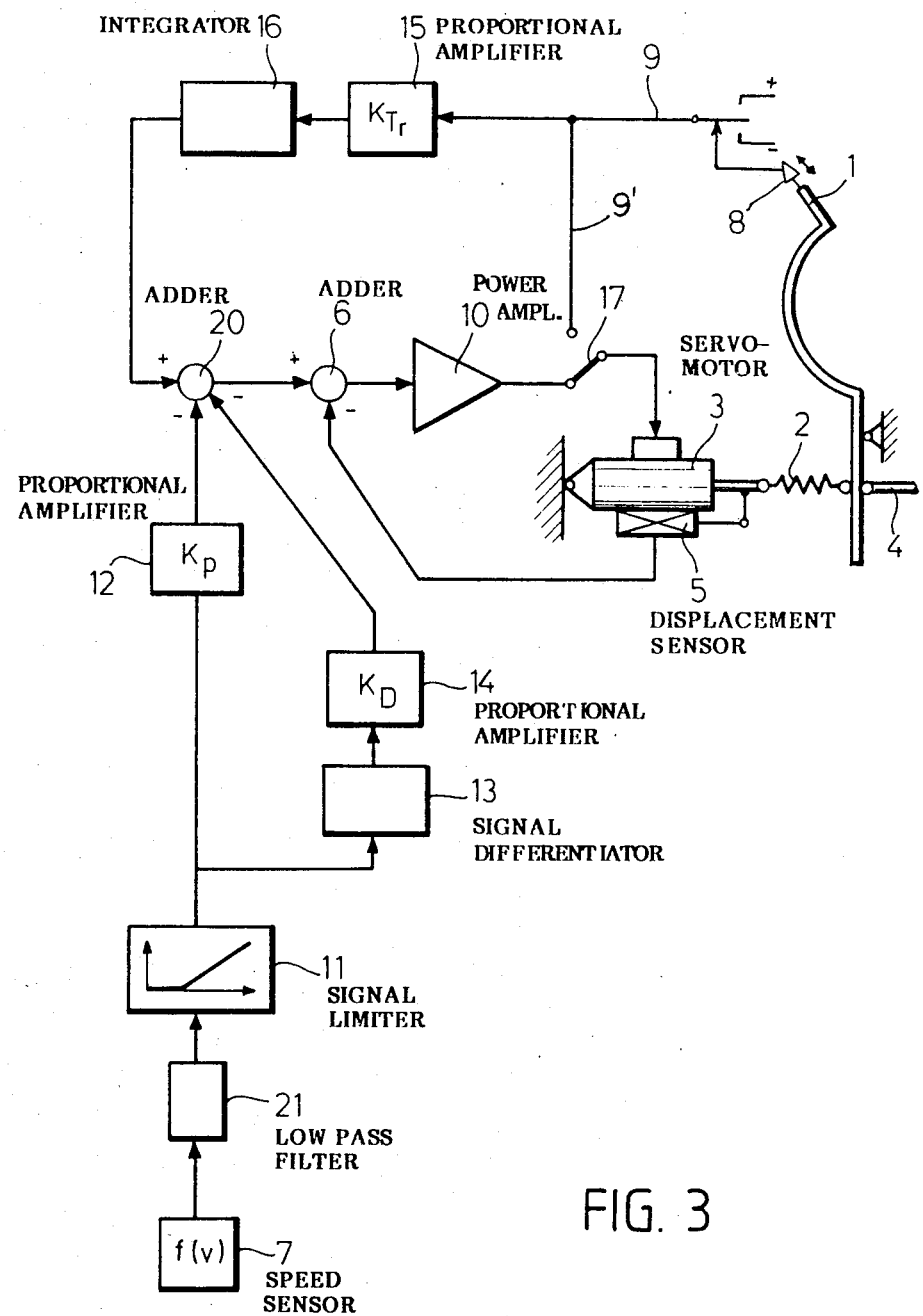
FIG. 3 is a circuit diagram of a further embodiment of an apparatus according to the invention.

DETAILED DESCRIPTION OF PREFERRED EXAMPLE EMBODIMENTS AND OF THE BEST MODE OF THE INVENTION

FIG. 2 shows a steering column 1 used for influencing the cyclical rotor blade adjustment, whereby the longitudinal displacement D of the steering column 1 is indicated by the respective arrow in the sense of increasing values. These values are plotted in FIG. 1 as a function of the flight speed v, whereby the full line curve $D(v)$ represents the prior art and the dashed line characteristic $P(v)$ represents the invention. The steering column 1 is tiltable about a fixed pivot point 18. A steering linkage 4 is pivoted at 4' to a point along the lower end of the steering column 1. The steering linkage 4 is effective directly on the rotor blade adjustment. One end of a spring 2 is pivoted at 2' to the lower end of the steering column 1. The other end of the spring 2 is pivoted at 2" to an adjustment member 3' of a servomotor 3. Preferably, the two pivot points 2' and 4' are located approximately opposite each other. The servomotor 3 is connected to a fixed point 19 providing a reference point. Depending on the control signals, the servomotor 3 can either compress or stretch the spring 2.

The servomotor 3 receives its input signal from a power amplifier 10 which is connected with its input to a summing network 6. The summing network receives at one of its inputs a signal S representing the flight speed measured by the flight speed sensor 7. The other input of the summing network 6 is connected to a displacement sensor or pick-up 5 providing a feedback signal R representing the adjustment movement or distance caused by the servomotor 3. Generally, the feedback signal R will be modified by a preselectable proportionality factor. Circuit means for such signal modification are well known in the art. The flight speed signal sensed by the flight speed sensor 7 passes through a signal limiter 11 and through a proportional amplifier 12 before passing to one input of the adder 6. The signal limiter 11 makes sure that only a signal is passed on which exceeds a predetermined threshold value of the flight speed. The flight speed signal may, depending on the type of flight speed sensor, be proportional to the flight speed. However, the signal S may also rise with the square of the flight speed as would be the case, for example, when the sensor 7 is a Pitot tube type sensor. The signal appearing at the output of the limiter 11 is modified in the proportional amplifier 12 by an adjustable proportionality factor $K_p$ so that at the output of the proportional amplifier 12 the modified signal S representing the flight speed is available for the adder 6.

The arrangement of FIG. 2 operates as follows. Let it first be assumed that the steering column 1 is in a condition free of forces. In other words, it is assumed that the steering column has been trimmed by a trimming gear, not shown, into a state representing a given flight condition. If the flight speed v is above the predetermined threshold, a speed dependent signal S will be available at the respective input of the adder 6. However, due to the feedback signal R, the adder 6 does not provide any output signal in this stationary condition in which the steering column is free of forces. Stated differently, in this condition the adjustment displacement by the servomotor 3 is constant.

If the pilot now causes a speed increase by operating the power lever, not shown, a certain increase in the forward speed results instantaneously, whereby a certain correction of the pitching attitude of the helicopter must be made by a respective movement of the steering column 1 in order to avoid changing a level flight into a rising flight. The increased forward speed causes a respective increase in the speed dependent signal S so that the servomotor 3 receives a control signal which reduces the adjustment displacement and thus causes a stretching of the spring 2. The stretching of the spring 2 applies a pull to the lower portion of the steering column, thereby simultaneously imparting to its upper portion a certain pressure in the backward direction and this pressure is transmitted to the hand of the pilot. If the helicopter speed has been increased in the lower flight speed range, below the maximum in the full line curve in FIG. 1, the longitudinal displcement of the steering column 1 must be increased. In other words, the steering column 1 must be tilted forwardly, as indicated by the arrow D in FIG. 2. If the pilot performs this operation, the spring 2 is further stretched so that the control force also increases. This is the feature which is required in the case of a speed increase for imparting the proper feel to the pilot. The now occurring further speed increase causes a respective increase in the speed dependent signal S, whereby the displacement caused by the servomotor 3 is further reduced, thereby additionally stretching the spring 2. As a result, the pilot is induced, already at the beginning of a corrective motion of the steering column 1 to move the latter in the proper direction and to do this blindly so to speak or instinctly. This inducement is due to the steering control characteristic which, according to the invention is speed dependent as shown by the dashed line P(v) in FIG. 1. By providing the proper amplification factor $K_p$ for the proportional amplifier 12, it is possible to assure that the reduction in the displacement by the adjustment member 3' of the servomotor 3 is adequate for the particular speed increase caused by the pilot.

In the upper speed range, that is to the right of the maximum value in the full line curve in FIG. 1, where a negative slope begins, the apparatus according to the invention operates as follows. The small increase in the forward speed caused by an actuation of the power lever again causes a respective reduction in the displacement caused by the servomotor 3, whereby the spring 2 is stretched. Such stretching of the spring again causes a backwardly effective pressure which is transmitted to the hand of the pilot holding the steering column 1. If the pilot now wants to move the steering column 1 in the forward direction indicated by the arrow D, this will cause an instantaneous reduction in the flight speed in this upper speed range, whereby the displacement caused by the servomotor 3 is instantaneously increased correspondingly, causing the spring to be respectively released or at least stretched to a lesser extent, whereby the pilot instantaneously senses a reduction in the resistance of the steering column due to the resulting reduction in the manual or control force. As a result, the pilot receives a signal telling him that in this instance it is not advisable to move the steering column 1 in the forward direction. However, if the pilot permits the steering column 1 to move backwardly in response to the pull of the spring 2, this corresponds to a reduction of the longitudinal displacement D of the steering column which in turn causes a simultaneous increase of the speed in accordance with the full line curve of FIG. 1 in the upper speed range of this curve. As a result, the displacement caused by the servomotor 3 is reduced, whereby the spring is further stretched and that to an extent larger than would correspond to the relatively slow backward movement of the steering column. In this instance the backward movement of the steering column 1 also will cause an increase in the manual or control force exactly in the sense of the requirements set forth above. Thus, in view of the just described operation of the apparatus according to FIG. 2 it is clear that the invention makes it possible for the pilot to move the steering column 1 in the correct direction by cautiously feeling the reaction of the steering column 1 even without knowing the speed range in which the pilot is presently operating.

As mentioned above, the dashed curve P(v) in FIG. 1 represents the steady rise of the manual or control force P on the steering column as a function of the flight speed. According to the invention the manual force rises proportionally to the speed in the lower speed range and thus proportionally to the longitudinal displacement D. However, according to the invention this steady rise continues even where the actual longitudinal displacement D turns into a negative slope after passing through its maximum. The characteristic of the dashed line curve P(v) depends on the type of flight speed sensor and it also depends on the amplification factor $K_p$ of the proportional amplifier 12. If the speed sensor is a Pitot tube, the speed dependent signal S has a square speed dependency. However, it is also possible and permissible to measure the flight speed by other means, whereby, for example, a linear relationship between the signal S and the speed v is obtained.

FIG. 3 shows a block circuit diagram of a further embodiment of the apparatus according to the invention, whereby a trimming motor normally available anyway, is used as the servomotor 3. A trimming switch 8 is provided at the upper end of the steering column 1 for selectively connecting a trim conductor 9 either to a positive or to a negative voltage when the trim switch 8 is operated. The trim conductor 9 has a branch conductor 9' leading to a changeover switch 17 having a sole contact 17 connected to the control input of the servomotor 3 and selectively connectable to the branch conductor 9' or to the output of an amplifier 10. In the shown position of the switch 17 the input of the servomotor 3 is connected to the amplifier 10. In the other position of the switch 17 the input of the servomotor 3 is connected to the trimming switch 8.

In the position of the switch 17 shown in FIG. 3, the trim signal is first supplied to a proportional amplifier 15 through the conductor 9 and then to an integrator 16. The output of the integrator 16 is connected to one input of a summing network 20 functioning as a signal subtraction member in which two further signals are subtracted from the integrated signal. The resulting signal at the output of the network 20 is supplied to one input of the adder 6 the other input of which receives the feedback signal R from the displacement pick-up 5 sensing the displacement caused by the servomotor 3. Networks 6 and 20 are signal combining circuits.

The speed dependent signal provided by the flight speed sensor 7 is first supplied to a low pass filter 21, then passes through a signal limiter 11 which provides at its output an output signal only when the measured flight speed exceeds a preselectable threshold value. The output signal from the signal limiter 11 is supplied to a proportional amplifier 12, the output of which is connected to one input of the subtraction circuit 20. A signal differentiating network 13 connected in series with a proportional amplifier 14 is connected in parallel to the proportional amplifier 12 so that the output of the proportional amplifier 14 is connected to a further input of the subtraction circuit 20. This parallel network has a damping function, especially with regard to avoiding continuous vibrations, thereby increasing the dynamic stability of the system.

The function of the arrangement according to FIG. 3 is analogous to the function of the arrangement according to FIG. 2 to the extent or insofar as the same circuit components and signal paths are concerned. FIG. 3 additionally shows explicitly how the conventional trimming of the steering column 1 cooperates with the features according to the invention. If, following a flight speed change a new stable flight condition is established without a trimming of the steering column, the pilot can now trim the steering column 1, for example, by applying a positive voltage to the trimming conductor 9. If the changeover switch 17 is in the position shown in FIG. 3, the trim motor or rather the servomotor 3 will thus be caused to change the displacement in such a way that by changing the spring tension the steering column 1 will be brought into a trim condition free of any forces. Out of this trimmed condition of the steering column it is possible to cause speed changes at any time, whereby the signal path from the flight speed sensor 7 to the subtraction circuit 20 and on through the adder 6 becomes effective in a manner analogous to the function described above with reference to FIG. 2. It is possible in this context to combine the circuits 6 and 20 into a single component, whereby the proper polarity of the signals applied to such a combined component must be taken into account. The pilot has, at any time, the possibility to apply instructions to the trim motor by a respective switch-over of the switch 17.

Although the invention has been described above with reference to helicopters, it is to be understood that the invention is applicable to any other type of aircraft. The problems discussed above with reference to FIG. 1 are also present in other types of aircraft.

Speed changes in other aircraft are also caused by operating the power lever or gas pedal effective on the propulsion plant and by operating the steering column which is effective on the elevator adjustment. Here again it is necessary to perform a pitch attitude correction with the steering column after the power lever or gas pedal has been operated.

Although the invention has been described with reference to specific example embodiments, it will be appreciated, that it is intended, to cover all modifications and equivalents within the scope of the appended claims.

What I claim is:

1. A method for stabilizing the steering force in an aircraft, wherein a steering column is connected in an articulated manner through a steering linkage to controlled means, comprising the following steps:
    (a) measuring the flight speed and producing a flight speed signal which is speed dependent at least above a certain speed threshold value,
    (b) measuring a displacement caused by a servomotor pivoted through a spring to said steering column at a point located approximately opposite a point at which said steering linkage is articulated or pivoted to said steering column, and producing a displacement responsive feedback signal, and
    (c) supplying said speed dependent signal and said feedback signal through signal combining means to said servomotor for controlling the tension state of said spring by any displacement caused by said servomotor in response to said speed dependent signal as modified by said feedback signal for imparting to said steering column through the instantaneous tension state of said spring a reaction force which signals to the pilot the correct movement direction to be imparted to the steering column.

2. The method of claim 1, wherein said feedback signal varies in the same sense as the displacement caused by said servomotor.

3. An apparatus for stabilizing the steering force in an aircraft, comprising a steering column, and controlled means for said stabilizing, pivoting means and steering linkage means for connecting said steering column to said controlled means in an articulated manner, flight speed sensing means for measuring the flight speed, circuit means connected to said flight speed sensing means for producing a speed dependent signal, servomotor means, spring means and pivot connecting means for operatively connecting said servomotor means to said steering column for imparting a reaction force to said steering column in accordance with the tension state of said spring means, said pivot connecting means securing one end of said spring to said steering column at a point located approximately opposite a point at which said steering linkage means is articulated or pivoted to said steering column, pick-up means connected to said servomotor means for producing a displacement dependent feedback signal, signal combining means connected for receiving said speed dependent signal and said feedback signal to produce a control signal, means connecting an output of said signal combining means to a control input of said servomotor means for modifying said reaction force by the instantaneous spring tension state which signals to the pilot the correct movement direction to be imparted to the steering column.

4. The apparatus of claim 3, wherein said signal combining means comprise a signal adding circuit.

5. The apparatus of claim 3, further comprising a power amplifier opertively connected between said signal combining means and said control input of said servomotor means.

6. The apparatus of claim 3, further comprising a signal limiter opertively connected between said signal combining means and said flight speed sensing means.

7. The apparatus of claim 3, further comprising proportional amplifier means operatively connected between said signal combining means and said flight speed sensing means.

8. The apparatus of claim 7, further comprising vibration damping circuit means including a series connection of a differentiating circuit means and an amplifier, said series connection being connected in parallel to said proportional amplifier.

9. The apparatus of claim 3, wherein said flight speed sensing means comprise a Pitot tube.

10. The apparatus of claim 3, wherein said servomotor means comprise a trim-motor, said apparatus further comprising single pole double throw trimming switch means operable by a pilot, a double pole trimming voltage source, and circuit means connected to said trimming switch means for operatively connecting one or the other pole of said trimming voltage source to an input of said signal combining means.

11. The apparatus of claim 10, further comprising a switch-over switch arranged for directly connecting said trimming switch means to an input of said servomotor means.

12. The apparatus of claim 12, wherein said circuit means for operatively connecting one or the other pole of said trimming voltage source to an input of said signal combining means comprise a proportional amplifier and an integrating circuit connected in series with said proportional amplifier.

13. The apparatus of claim 12, further comprising a switch-over switch arranged for directly connecting said trimming switch means to an input of said servomotor means.

* * * * *